United States Patent

Walsh et al.

[11] Patent Number: 5,713,323
[45] Date of Patent: Feb. 3, 1998

[54] INTEGRATED AIR/FUEL INDUCTION SYSTEM FOR AN INTERNAL COMBUSTION ENGINE

[75] Inventors: David Stephen Walsh, Novi; Anthony Horvath, Temperance; John Christian Sorensen; Kristi Marie Hameedi, both of Dearborn; Gerard Nicholas Panasuk, Commerce Township; Phillip Michael Gaskin, Brighton; James Douglas Taylor, Temperance, all of Mich.

[73] Assignee: Ford Motor Company, Dearborn, Mich.

[21] Appl. No.: 725,797

[22] Filed: Oct. 4, 1996

[51] Int. Cl.⁶ ............................................ F02M 35/10
[52] U.S. Cl. .................................. 123/184.42; 123/469
[58] Field of Search ............................ 123/468, 469, 123/456, 184.21, 184.53, 184.61, 184.42

[56] References Cited

U.S. PATENT DOCUMENTS

| | | | |
|---|---|---|---|
| 3,783,842 | 1/1974 | Kuhn et al. | 123/469 |
| 4,294,215 | 10/1981 | Hans et al. | 123/470 |
| 4,457,280 | 7/1984 | Hudson, Jr. | 123/470 |
| 4,516,555 | 5/1985 | Shioya et al. | 123/470 |
| 4,519,368 | 5/1985 | Hudson, Jr. | 123/468 |
| 4,776,313 | 10/1988 | Freismuth et al. | 123/470 |
| 4,805,564 | 2/1989 | Hudson, Jr. | 123/470 |
| 4,872,424 | 10/1989 | Carnes | 123/184.32 |
| 4,907,547 | 3/1990 | Daly | 123/184.61 |
| 4,919,086 | 4/1990 | Shillington | 123/306 |
| 4,996,962 | 3/1991 | Usui | 123/468 |
| 5,003,933 | 4/1991 | Rush, II et al. | 123/519 |
| 5,012,770 | 5/1991 | Okamoto et al. | 123/184.42 |
| 5,020,483 | 6/1991 | Watanabe | 123/73 A |
| 5,074,257 | 12/1991 | Amano et al. | 123/184.42 |
| 5,094,194 | 3/1992 | Rush, II et al. | 123/184.42 |
| 5,163,406 | 11/1992 | Daly et al. | 123/456 |
| 5,233,963 | 8/1993 | Gregorius et al. | 123/456 |
| 5,259,356 | 11/1993 | Karlsson et al. | 123/184.21 |
| 5,261,375 | 11/1993 | Rush, II et al. | 123/470 |
| 5,357,931 | 10/1994 | Semence | 123/184.61 |
| 5,477,819 | 12/1995 | Kopac | 123/184.61 |
| 5,494,011 | 2/1996 | Haller | 123/184.32 |
| 5,560,330 | 10/1996 | Andress et al. | 123/184.53 |
| 5,575,247 | 11/1996 | Nakayama et al. | 123/184.21 |

*Primary Examiner*—David A. Okonsky
*Attorney, Agent, or Firm*—Neil P. Ferraro

[57] ABSTRACT

An integrated air/fuel induction system for a multicylinder internal combustion engine includes an intake manifold assembly having an airbox for providing a source of intake air for consumption by the engine. The intake manifold assembly also includes an air plenum communicating with the airbox. A plurality of intake runners is integrally formed, at least partially, within the airbox, for directing intake air flowing from the plenum into each cylinder of the engine. The airbox thereby encapsulates and utilizes the volume of space surrounding the intake runners. The integrated air/fuel induction system also includes a fuel rail removably latched to the manifold assembly. A biasing member is provided to compensate for any slack between the fuel rail and the manifold assembly. In addition, rotational and axial locators are provided so as to position the fuel rail relative to the engine.

27 Claims, 6 Drawing Sheets

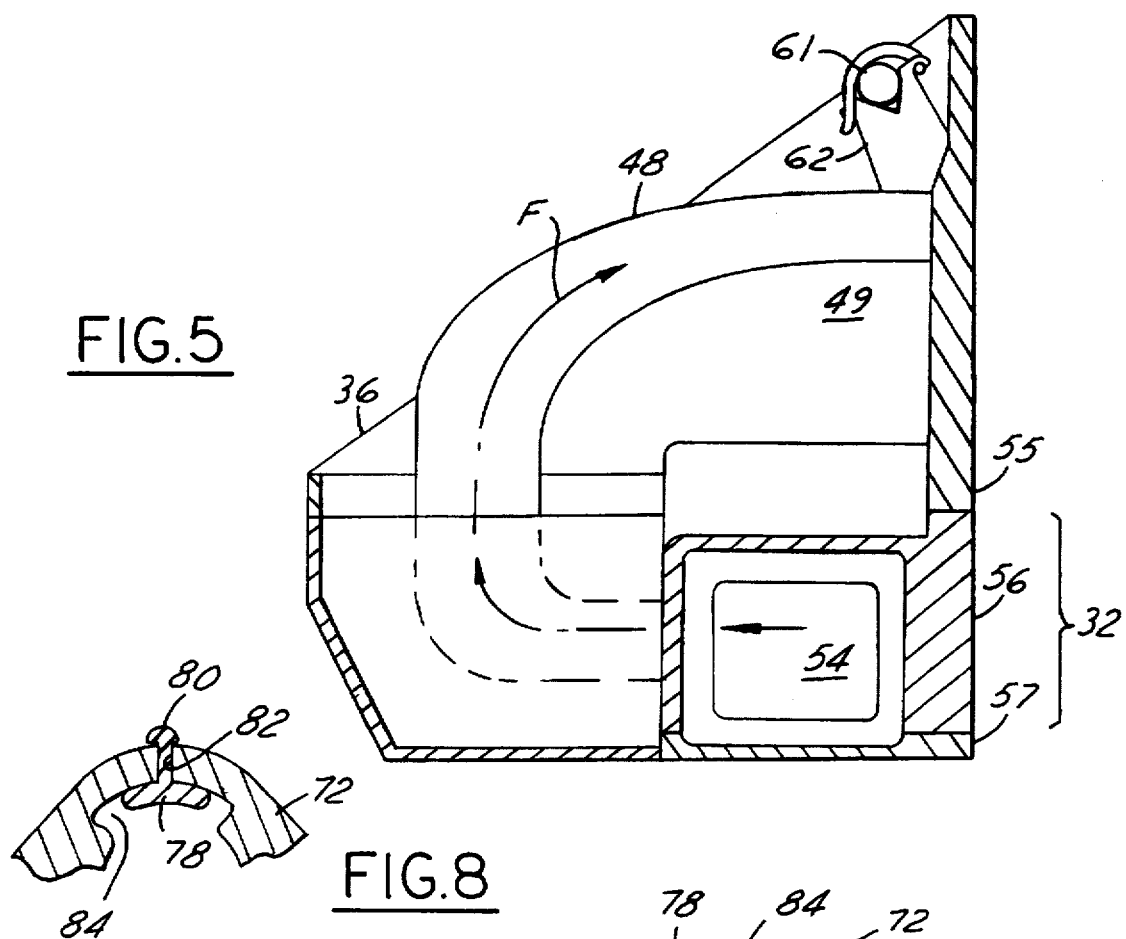
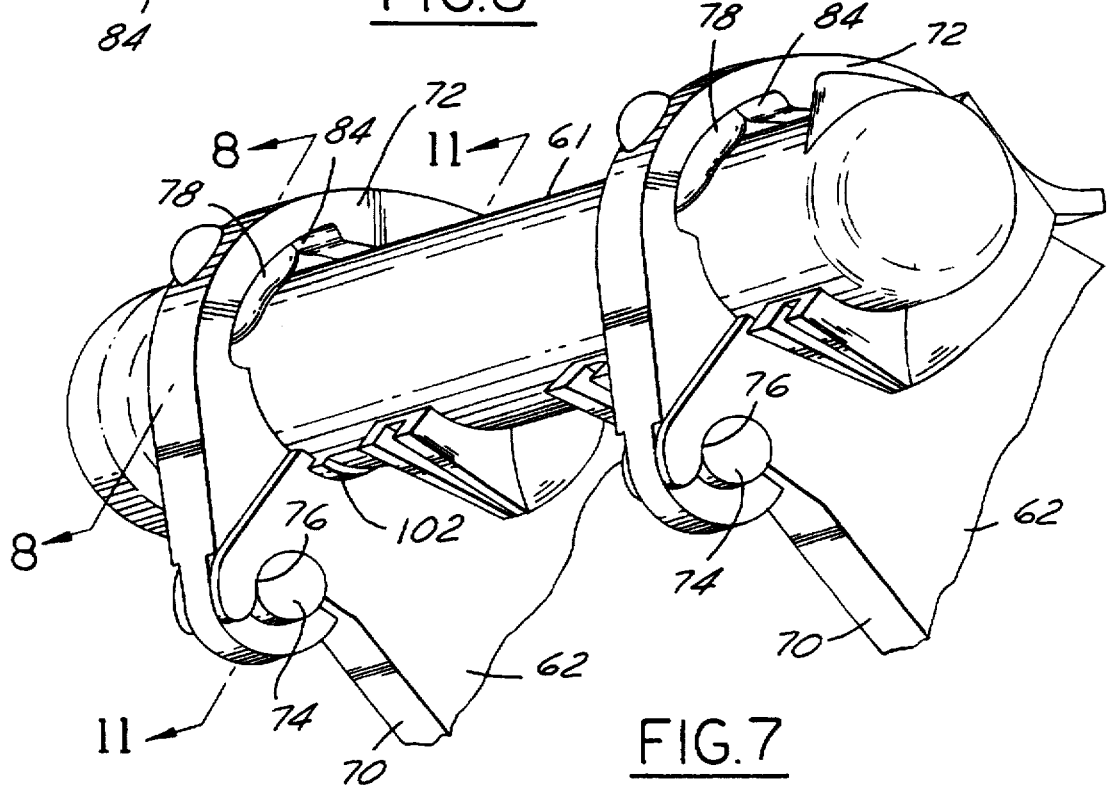

INTEGRATED AIR/FUEL INDUCTION SYSTEM FOR AN INTERNAL COMBUSTION ENGINE

FIELD OF THE INVENTION

The invention relates generally to induction systems for internal combustion engines and, more particularly, to integrated induction systems for delivering air and fuel to the engine.

BACKGROUND OF THE INVENTION

Induction systems for automotive internal combustion engines deliver air and fuel to the cylinders of the engine. The components used in these systems, such as fuel injectors and air manifolds, are typically installed on the engine. Separate installation of these various components generally requires a large amount of space to maneuver during both assembly and maintenance, thereby increasing the overall package size of the air/fuel induction system.

Numerous prior art attempts have been made to integrate into a single-unit induction system as many components as possible. The inventors of the present invention have found certain disadvantages with these prior art systems. For example, these systems tend to be complex in design as well as expensive to mass produce. In addition, these systems tend not to make efficient use of space available near the engine, and manufacturing, assembly and maintainability ease is compromised. Moreover, the inventors of the present invention recognize that a large intake airbox volume is desirable to reduce noise, vibration, and harshness (NVH).

SUMMARY OF THE INVENTION

An object of the present invention is to provide an integrated air/fuel induction system that makes efficient use of the space near the engine to incorporate many of the components of the air/fuel induction system while improving manufacturing, assembly, maintainability and NVH.

This object is achieved and disadvantages of prior art approach are overcome by providing a novel integrated air/fuel induction system for a multi-cylinder internal combustion engine. The system includes an intake manifold assembly having an air inlet for allowing intake air into the manifold assembly. The manifold assembly also includes a first cover and a base assembly, defining an airbox, for providing a source of intake air for consumption by the engine. The first cover is removable from the base assembly so as to allow ease of accessibility into the manifold assembly. The manifold assembly also includes an air plenum communicating with the airbox. A plurality of intake runners is integrally formed, at least partially, within the manifold assembly, for directing the intake air flowing from the throttle valve into each cylinder of the engine. The airbox thereby encapsulates and utilizes the volume of space surrounding the intake runners. A throttle valve is mounted to the manifold assembly and communicates between the airbox and the plenum for metering the intake air supplied to the engine. In addition, by providing a sizable volume of space for intake air, NVH of the vehicle may be significantly improved.

In a preferred embodiment, a second cover is removably attached to the first cover. An air filter is disposed within the second cover so as to filter air entering the manifold assembly.

Also in a preferred embodiment, a fuel rail is removably attached to the manifold assembly. The manifold assembly includes a fuel rail mount for mounting the fuel rail within the manifold assembly. The fuel rail mount includes a fuel rail base and a fuel rail latch. The fuel rail base receives the fuel rail and the latch cooperates with the fuel rail base for removably latching the fuel rail to the fuel rail mount. In addition, a biasing member is used in the fuel rail mount to compensate for any slack between the fuel rail and the mount, thereby continually providing a locking force on the fuel rail. To properly align the fuel rail relative to the engine, the fuel rail includes a rotational locator that cooperates with the mount such that the fuel rail may be rotationally positioned relative to the engine. Also, the fuel rail includes an axial locator which cooperates with the mount such that the fuel rail may be axially positioned relative to the engine. To reduce tolerance stack-up between the fuel rail and mount, the rotational locator is also the manufacturing datum of the fuel rail.

As used herein, the term "datum" means a point, line or surface with reference to which positions are measured or indicated.

An advantage of the present invention is that greater packaging efficiency may be obtained.

Another advantage of the present invention is that ease of manufacturing, assembly and maintenance may be obtained.

Still another advantage of the present invention is that NVH may be improved.

Yet another advantage of the present invention is that dimensional tolerances may be significantly reduced, thereby improving system performance.

Other objects, features and advantages of the present invention will be readily appreciated by the reader of this specification.

BRIEF DESCRIPTION OF THE DRAWINGS

The invention will now be described, by way of example, with reference to the accompanying drawings, in which:

FIG. 5 is a cross-sectional view of the system taken along line 5—5 of FIG. 3;

FIG. 7 is a perspective view of a fuel rail assembly according to the present invention;

FIG. 8 is a cross-sectional view of the fuel rail assembly taken along line 8—8 of FIG. 7;

DETAILED DESCRIPTION OF THE PREFERRED EMBODIMENTS

Figure 1:
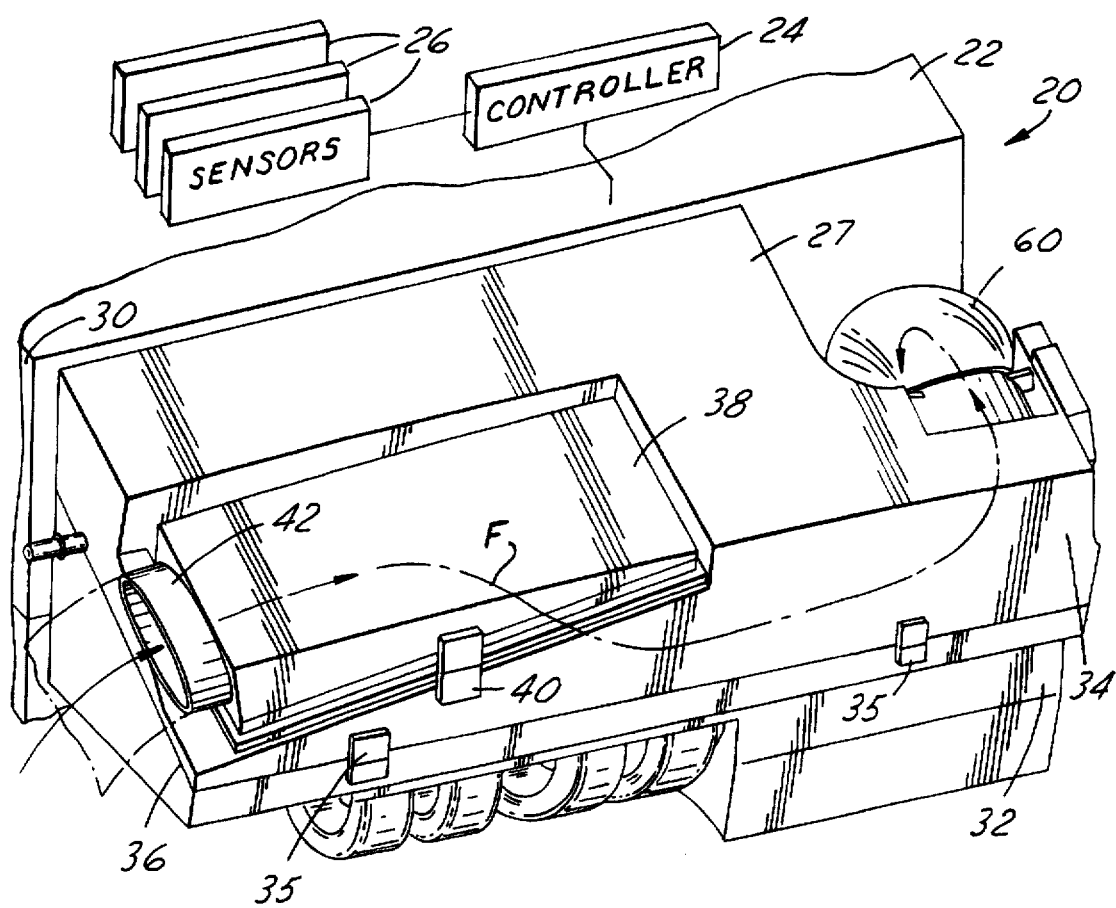
FIG. 1 is a perspective view of an integrated air/fuel induction system according to the present invention.

Integrated air/fuel induction system 20, shown attached to engine 22 in FIG. 1, delivers intake air and fuel into a plurality of cylinders (not shown) of engine 22. Engine 22 is controlled by controller 24 having a memory storage device (not shown). A plurality of sensors 26 senses numerous engine operating parameters, such as engine speed, load, spark timing, EGR rate, fuel delivery rate, engine air charge temperature, engine coolant temperature, intake manifold absolute pressure, throttle valve position, vehicle gear selection, vehicle speed, intake manifold air mass flow rate, accelerator position, and other parameters known to those skilled in the art and suggested by this disclosure. Controller 24 may comprise a conventional engine control microprocessor known to those skilled in the art or a stand-alone processor, as desired. Controller 24 is charged with the task of controlling, among others, the air/fuel ratio delivered to engine 22 by system 20 based on the plurality of sensed engine operating parameters.

Air/fuel induction system 20 includes intake manifold assembly 27, formed of a plastic material, mounted to cylinder head 30 of engine 22. Intake manifold assembly 27 is formed of base assembly 32, first cover 34 and second cover 38. First cover 34 is attached to base assembly 32 by latches 35. Mating surface 36 between base assembly 32 and first cover 34 is formed at an angle for ease of access when first cover 34 is removed, as will be further described with reference to FIG. 3. Second cover 38 is attached to first cover 34 by a suitable means such as latch 40.

Figure 2:
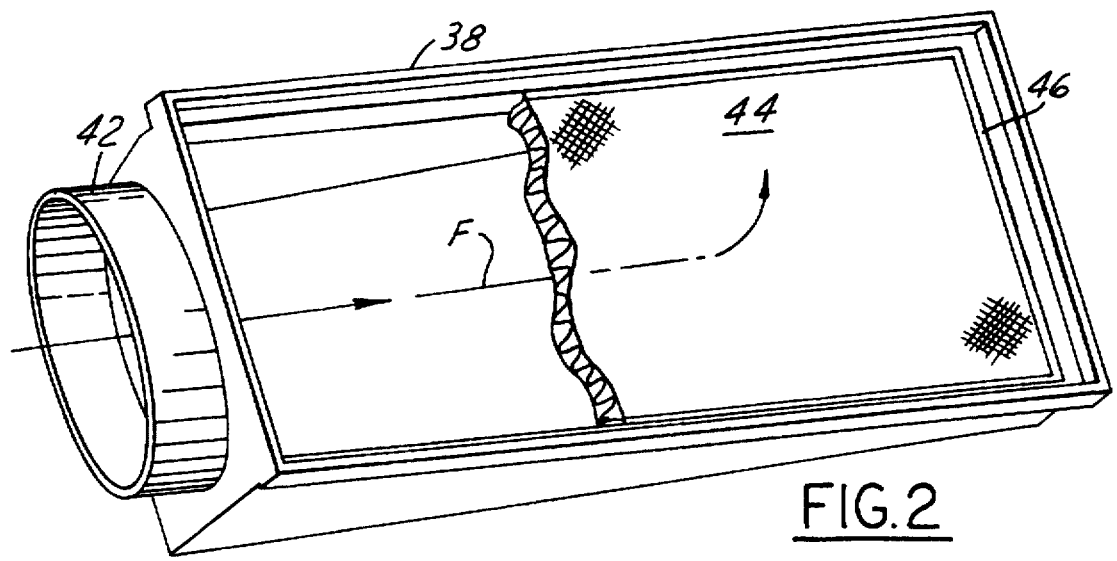
FIG. 2 is a perspective view of the underside of a cover of the system.

FIG. 2, which is an underside view of cover 38, shows second cover 38 including air inlet 42 and filter 44 (shown partially broken away) disposed within cover 38 such that filtered air may enter manifold assembly 27. Seal 46, made of a suitable sealing material, is formed on the outer edge of filter 44 to sealingly engage first cover 34 of manifold assembly 27 when cover 38 and filter 44 is attached thereto. Filter 44 may be any filter such as a screen or fiber filter known to those skilled in the art and suggested by this disclosure. With latch 40 securely removably attaching cover 38 to cover 34, filter 44 may be easily replaced at regular maintenance intervals.

Figure 3:
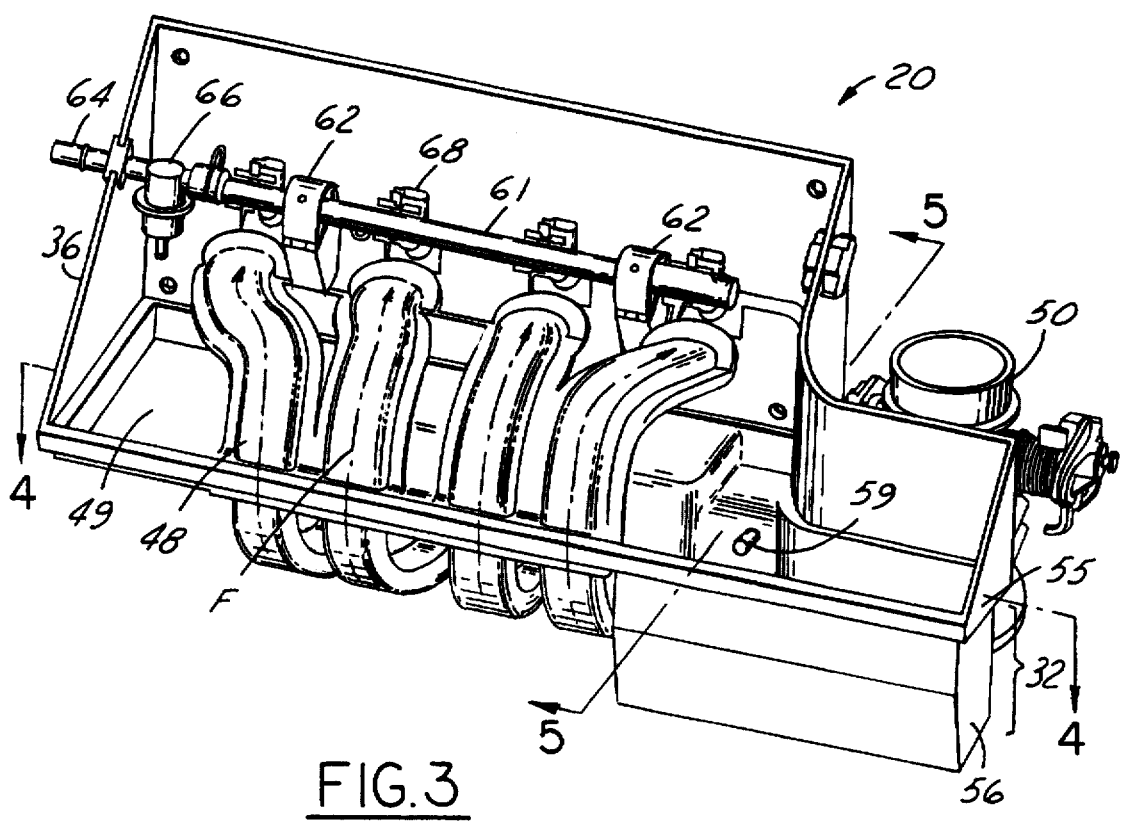
FIG. 3 is a perspective view of the interior of the system.

Turning now to FIG. 3, integrated air/fuel induction system 20 is shown with first cover 34 removed. By providing base assembly 32 with the angularly disposed mating surface 36, easy access to the interior of manifold assembly 27 is accomplished, which subsequently improves maintenance efficiency. That is, there is no portion of manifold assembly 27 which can interfere during assembly and maintenance. According to the present invention, system 20 is formed with a plurality of intake runners 48 integrally formed at least partially within intake manifold assembly 27. Intake runners 48 direct intake air into each cylinder, respectively, of engine 22. According to one aspect of the present invention, air/fuel induction system 20 is best suited for encapsulating and utilizing the volume of space surrounding intake runners 48, thereby reducing package size. In addition, intake manifold assembly 27 provides a large airbox volume closer to the engine than has been previously obtained. That is, intake manifold assembly 27 includes airbox 49, defined by base assembly 32 and cover 34, which encapsulates the airbox volume typically provided within an air filter assembly located upstream of ordinary induction systems. In addition, small air volumes have greater NVH problems associated therewith. Thus, resonators are typically used to suppress the undesirable noise. According to the present invention, by providing a large airbox volume (i.e. encapsulating the airbox—or air filter assembly—within the manifold assembly), NVH may be improved with fewer or no resonators. In a preferred embodiment, the volume of air space within airbox 49 is 13.6 liters.

Figure 4:
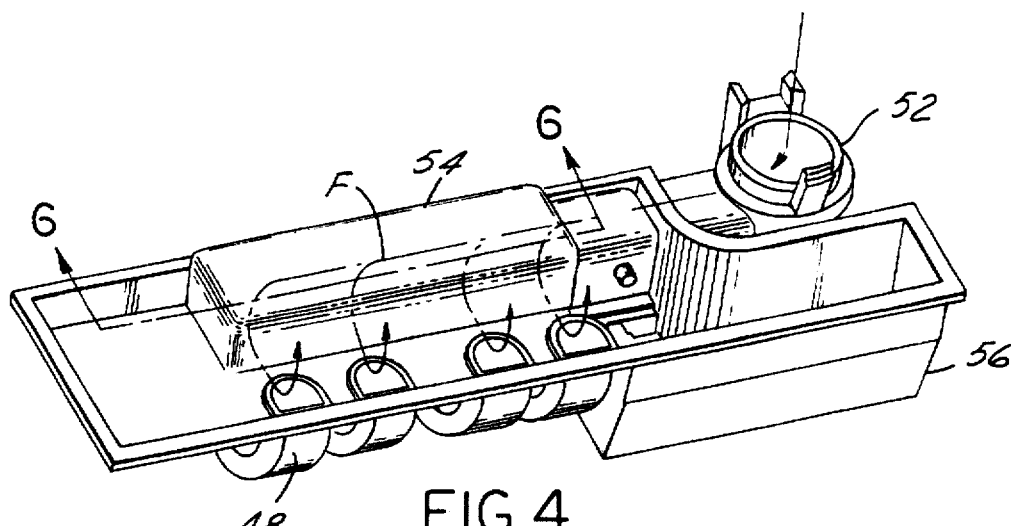
FIG. 4 is a perspective cross-sectional view of the system taken along line 4—4 of FIG. 3.

Referring now to FIGS. 3 and 4, system 20 also includes throttle valve 50 removably mounted to throttle base 52 formed upon base assembly 32. FIG. 4, which is a sectional view taken along line 4—4 of FIG. 3, shows air plenum 54 communicating between throttle valve 50 and intake runners 48. In a preferred embodiment, for ease of manufacturing, base assembly 32 includes four separate components (shown also in FIG. 15), namely side portion 55, base 56, base cap 57 and runner cap 58. Side portion 55 is formed with runner portion 55a and base 56 is mounted to side portion 55. Base 56 is formed with a portion of plenum 54 and intake runners 48. Base cap 57 is mounted to base 56 and thereby closes the portion of the plenum and intake runners formed in base 56. Runner cap 58 is mounted to runner portion 55a of side portion 55 thereby defining intake runners 48. Each component 55, 56, 57 and 58 is molded separately and may be joined together by vibration welding or other suitable fastening means. Thus, producing these components separately eliminates the need for using cores in the molding process.

Figure 6:
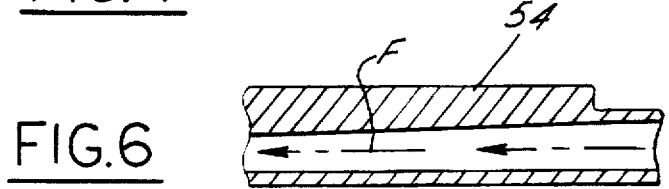
FIG. 6 is a cross-sectional view of the system taken along line 6—6 of FIG. 4.

Continuing now with reference to FIGS. 3–6, plenum 54 may have a cross-sectional area that decreases along the longitudinal length thereof. Thus, as shown in FIGS. 4–6, the cross-sectional area of plenum 54 is greater at the end adjacent throttle valve base 52. This allows substantially the same air flow to each intake runner 48. In a preferred embodiment, air induction system 20 includes by-pass air valve 59 which by-passes throttle valve 50 such that a portion of the intake air is fed directly from airbox 49 into plenum 54. As is well known to those skilled in the art, by-pass valve 59, which may be coupled to controller 24 if a solenoid by-pass valve is used, controls the idle speed of engine 22.

According to the present invention, as shown in FIGS. 1–6, air, shown as arrow "F", flows into inlet 42 and passes filter element 44. Filtered air then enters airbox 49 and flows into throttle valve 50 via duct 60. Airflow "F" then flows into plenum 54 to be distributed to intake runners 48, whereby the air is then directed to each cylinder of engine 22.

Integrated air/fuel induction system 20 also includes fuel rail 61 removably mounted to manifold assembly 27. This removable mounting arrangement, according to the present invention, obviates the need for mounting hardware and associated tools, as will become apparent hereinafter, and therefore provides ease of manufacturing, assembly and maintenance. As shown in FIGS. 3 and 5, fuel rail mount 62 is formed on manifold assembly 27 to removably attach fuel rail 61 thereto. Fuel rail 61 receives fuel from fuel inlet 64, which is connected to the fuel delivery system (not shown). The fuel pressure in fuel rail 61 is regulated by pressure regulator 66 attached to fuel rail 61. A plurality of fuel injectors 68 communicates with fuel rail 60 for supplying fuel to the intake ports (not shown) of engine 22.

Turning now to FIGS. 7–10, fuel rail 61 is shown attached to fuel rail mounts 62. Mounts 62 include fuel rail base 70 and fuel rail latch 72 pivotally attached to fuel rail base 70. Latch 72 is formed with pivot pin 74 and base 70 is formed with pivot opening 76. Pivot opening 76 only partially circumferentially extends around pivot pin 74. This allows for ease of manufacturing of base 70 because no core is required during molding and no secondary operations, such as drilling a hole to receive pivot pin 74, are required. In a preferred embodiment, the partial circumferential extension is sufficient to create a slight interference fit between pivot pin 74 and pivot opening 76 such that pivot pin 74 snaps into place. Latch 72 is thereby held securely in place.

Mount 62 also includes biasing member 78 made of an elastomeric material. When latch 72 locks fuel rail 61 to base 70, biasing member 78 compensates for any slack between fuel rail 61 and mount 62 so as to provide a continuous locking force thereto. Referring to FIG. 8, biasing member 78 is attached to latch 72 by inserting tip 80 of biasing member 78 into hole 82 of latch 72. When fully inserted, tip 80 emerges through hole 82 and expands to reduce the likelihood of biasing member 78 from dislodging therefrom. Latch 72 also includes recess portion 84 for receiving biasing member 78 and for providing sufficient space to allow biasing member 78 to radially expand when axially compressed to hold fuel rail 61 to mount 62, as previously described.

Figure 9:
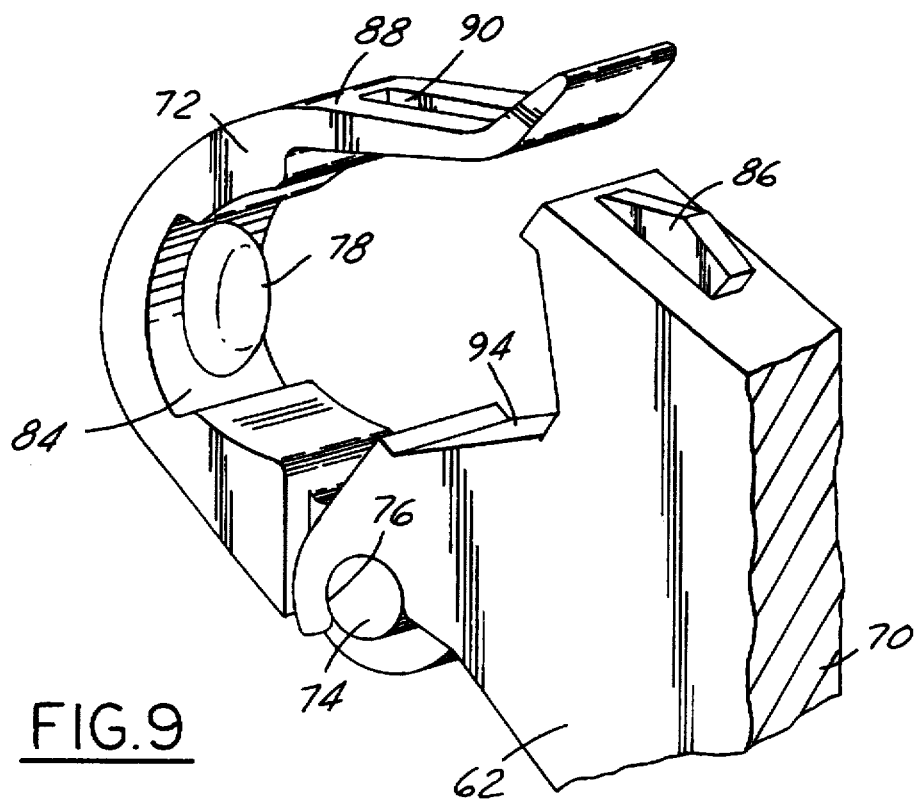
FIGS. 9 and 10 are perspective views of a fuel rail mount shown in the open and closed positions, respectively.
Figure 10:
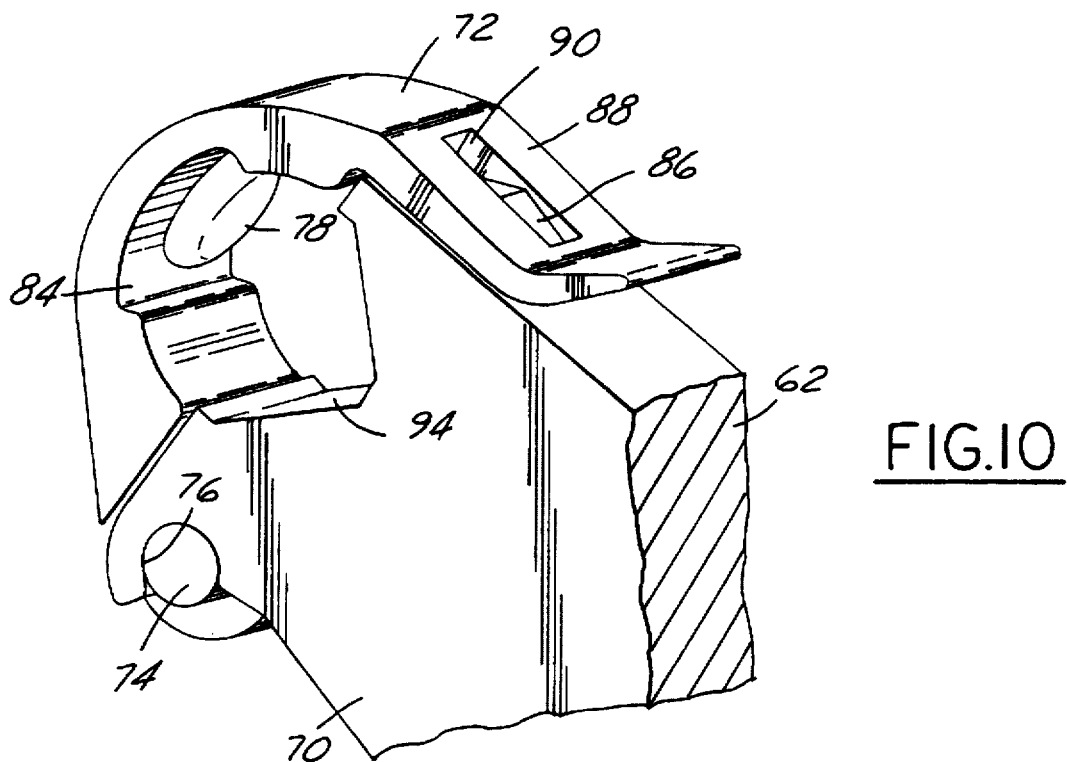

Referring now in particular to FIGS. 9 and 10, locking tab 86 is provided on base 62 to lock latch 72 thereto. Locking tongue 88 is cantilevered on latch 72 and has opening 90 to engage locking tab 86. Thus, when latch 72 is rotated between the positions shown in FIGS. 8 and 9, tongue 88 is wedged open by tab 86 until opening 90 becomes aligned with tab 86.

Figure 11:
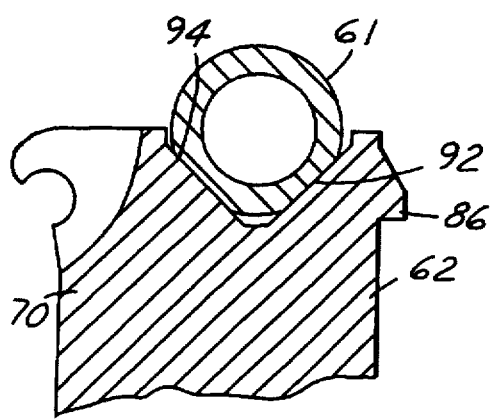
FIG. 11 is a cross-sectional view of the fuel rail assembly taken along line 11—11 of FIG. 7.

According to the present invention, it is important to both rotationally and axially locate fuel rail 61 relative to engine 22. Prior art fuel rail assemblies typically include mounting legs welded onto the fuel rail. The legs are then attached to the engine by mounting screws. The mounting legs also provide both axial and rotational location. A disadvantage with this approach is that a large tolerance stack-up may exist because the mounting datum (the mounting legs) is different from the manufacturing datum. According to the present invention, the mounting datum is the same as the manufacturing datum. As shown in FIG. 11, which is a cross-section of fuel rail assembly through line 11—11 of FIG. 7, fuel rail 61 is formed with at least one flat 92 formed in a sidewall thereof. According to the present invention, flat 92 is both the manufacturing datum as well as the mounting datum and therefore reduces any tolerance stack-up. In addition, flat 92 cooperates with the generally V-shaped groove 94 formed in base 62 to rotationally align fuel rail 61 relative to engine 22.

Figure 12:
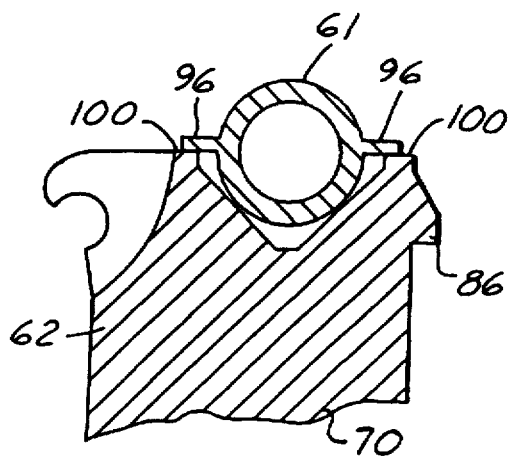
FIGS. 12 and 13 are alternative embodiments of the fuel rail assembly of FIG. 11.
Figure 13:
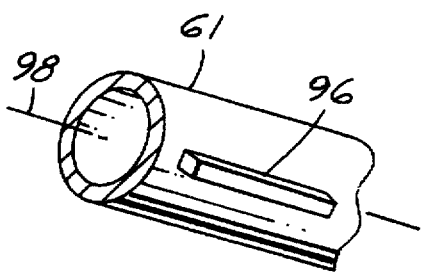

In an alternative embodiment, as shown in FIGS. 12 and 13, fuel rail 61 may be formed with tabs 96 laterally extending from the fuel rail 61. Tabs 96 extend in a plane substantially parallel to the longitudinal axis 98 of fuel rail 61. Tabs 96 rest on top surface 100 of base 62 so as to rotationally locate fuel rail 61 relative to engine 62. Here again, tabs 96 act as both the manufacturing and mounting datum, as well as the rotational locator.

Figure 14:
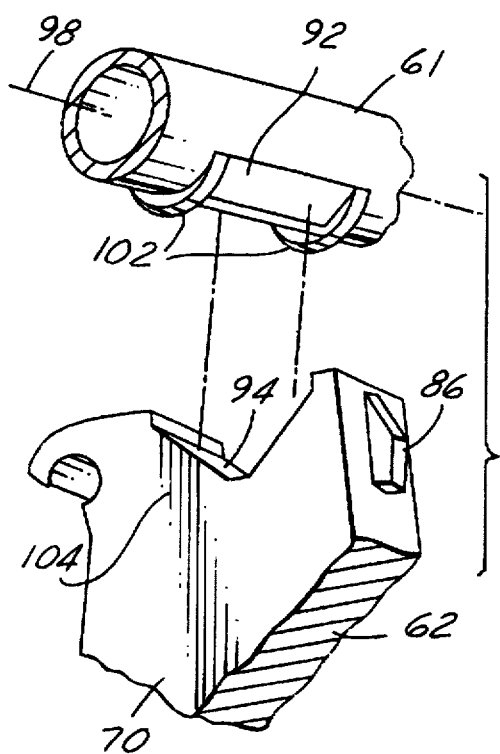
FIG. 14 is an exploded perspective view of the fuel rail assembly according to the present invention; and, FIG. 15 is an exploded perspective view of the integrated air/fuel induction system according to the present invention.

Referring now to FIG. 14, in a preferred embodiment, fuel rail 61 also includes an axial locator, such as rib 102 (see also FIG. 7) which cooperate with sides 104 of base 62 so as to axially position fuel rail 61 relative to engine 22. Ribs 102 radially extend from fuel rail 61 in a plane substantially perpendicular to longitudinal axis 98 and cradle mount 62 on either side 104, allowing precise axial positioning of fuel rail 61 relative to engine 22.

As a result, with the rotational and axial locators, both axial and rotational location is maintained, and thus a functional improvement in injector positioning and targeting is provided. If the rotational locator 92, 96, or the axial locator 102 of the present invention were not so provided, or if the fuel injectors themselves act as the rotational and axial locator, a side loading may be imparted on the fuel injectors with the undesirable result of uneven compression of fuel injector seals as well as misaligning fuel spray targeting and deforming spray patterns in the cylinders of the engine 22.

Figure 15:
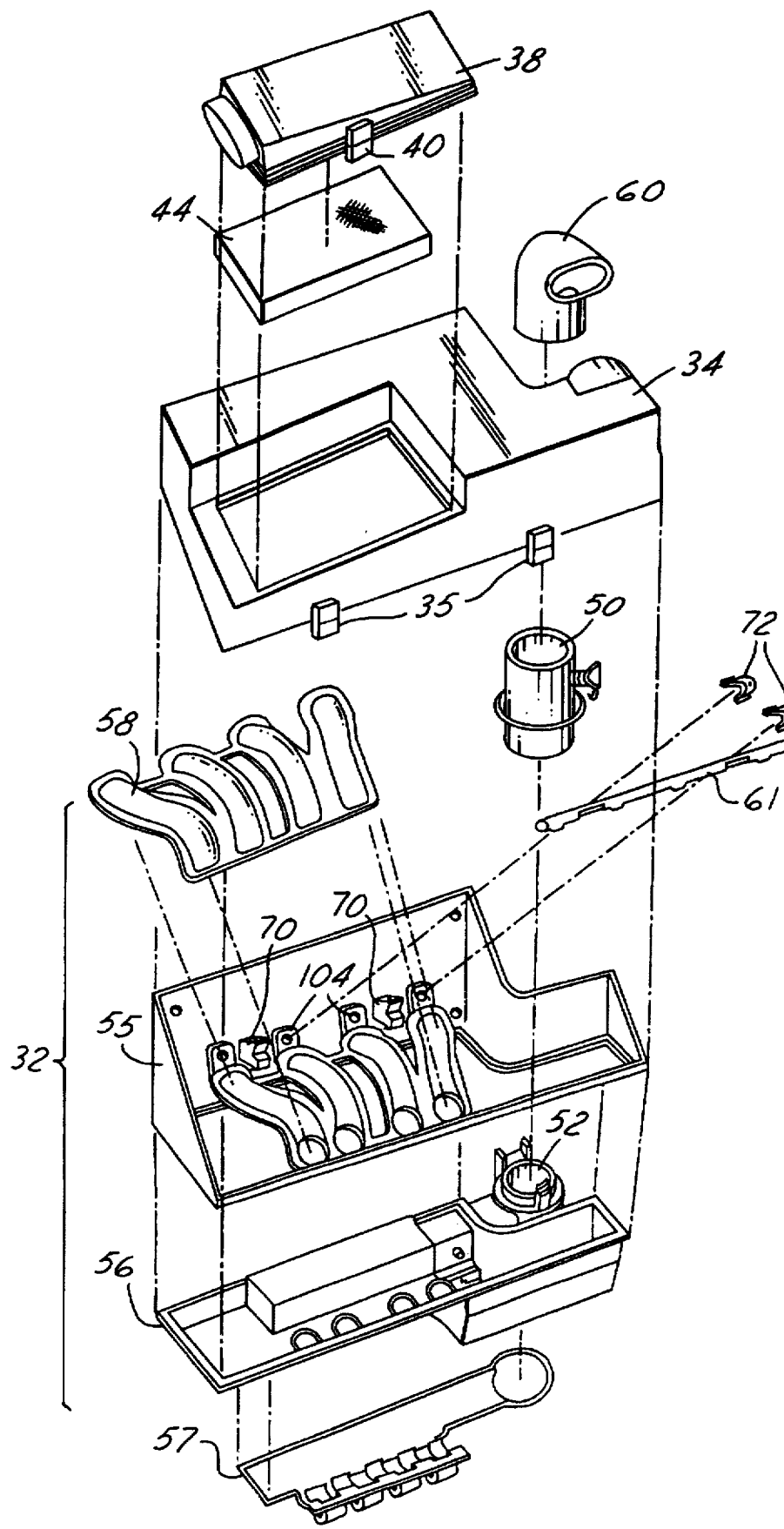

Referring now to FIG. 15, an exploded view of integrated air/fuel induction system 20 is shown. Side portion 55, base 56, base cap 57 and runner cap 58 are molded as separate pieces and are subsequently vibration welded together to form base assembly 32. Throttle valve 50 is then mounted to throttle base 52. Fuel rail 61 is attached to fuel rail mounting base 70 and locked in place by fuel rail latches 72. Injectors, not shown, are connected to fuel rail 61 and deliver fuel through injector ports 104. Cover 34 is then latched to base assembly 32 by latches 35. Duct 60 is then connected between cover 34 and throttle valve 50. Filter 44 is installed within cover 38 and together, attached to cover 34 by latch 40. Thus, an easy to manufacture, assemble and maintain integrated air/fuel induction system is provided.

While the best mode for carrying out the invention has been described in detail, those skilled in the art to which this invention relates will recognize various alternative designs and embodiments, including those mentioned above, in practicing the invention that has been defined by the following claims.

We claim:

1. An integrated air/fuel induction system for a multicylinder internal combustion engine comprising:
    an intake manifold assembly comprising:
        an air inlet for allowing intake air into said manifold assembly;
        a first cover and a base assembly for providing a source of intake air for consumption by the engine, with said first cover being removable from said base assembly so as to allow ease of accessibility into said manifold assembly, with said first cover and said base assembly defining an airbox;
        an air plenum communicating with said airbox; and,
        a plurality of intake runners integrally formed at least partially within said airbox and communicating with said plenum for directing intake air flowing from said plenum into each cylinder of the engine, with said airbox thereby encapsulating and utilizing the volume of space surrounding said intake runners; and,
    a throttle valve mounted to said manifold assembly and communicating between said airbox and said plenum for metering said intake air supplied to the engine.

2. A system according to claim 1 further comprising an air filter disposed within said manifold assembly for filtering intake air entering therein.

3. A system according to claim 2 further comprising a second cover removably attached to said first cover, with said second cover receiving said air filter and being formed with said air inlet.

4. A system according to claim 1 wherein said plenum comprises a cross section that reduces in area along the longitudinal length thereof so as to provide substantially the same air flow to each intake runner.

5. A system according to claim 1 further comprising an air by-pass valve for by-passing said throttle valve such that a portion of the intake air flows directly from said airbox into said plenum.

6. A system according to claim 1 wherein said first cover and said base assembly are joined on an angularly disposed mating surface thereby providing said ease of accessibility.

7. A system according to claim 1 wherein said base assembly comprises:
    a side portion, with said side portion being formed with a runner portion;
    a base mounted to said side portion, with said base being formed with a portion of said plenum;
    a base cap mounted to said base; and,
    a runner cap mounted to said runner portion of said side portion thereby defining said intake runners.

8. A system according to claim 1 further comprising a fuel rail defining a longitudinal axis, with said fuel rail being mounted within said manifold assembly for supplying fuel to the engine.

9. A system according to claim 8 wherein said manifold assembly comprises at least one fuel rail mount for mounting said fuel rail within said manifold assembly, with said fuel rail mount comprising a fuel rail base and a fuel rail latch, with said fuel rail base receiving said fuel rail and with said fuel rail latch cooperating with said fuel rail base for removably latching said fuel rail to said fuel rail mount.

10. A system according to claim 9 wherein said fuel rail latch is pivotally attached to said fuel rail base.

11. A system according to claim 9 wherein said fuel rail mount comprises a biasing member for compensating for any slack between said fuel rail and said mount thereby continually providing a locking force on said fuel rail.

12. A system according to claim 8 wherein said fuel rail comprises a rotational locator cooperating with said mount such that said fuel rail may be rotationally positioned relative to the engine.

13. A system according to claim 12 wherein said rotational locator is both a manufacturing datum and a mounting datum thereby reducing tolerance stack-up.

14. A system according to claim 12 wherein said rotational locator comprises one of a tab laterally extending from said fuel rail in a plane substantially parallel to said longitudinal axis or a flat formed in a sidewall of said fuel rail.

15. A system according to claim 14 wherein said fuel rail mount comprises a generally V shaped groove for receiving said fuel rail, with said flat in said sidewall of said fuel rail cooperating with said V groove.

16. A system according to claim 8 wherein said fuel rail comprises an axial locator cooperating with said mount such that said fuel rail may be axially positioned relative to the engine.

17. A system according to claim 16 wherein said axial locator comprises a rib radially extending form said fuel rail in a plane substantially perpendicular to said longitudinal axis.

18. A system according to claim 10 wherein said fuel rail base comprises a pivot opening and wherein said fuel rail latch comprises a pivot pin, with said pivot opening receiving said pivot pin and with said pivot opening circumferentially extending partially around said pivot pin.

19. An integrated air/fuel induction system for a multi-cylinder internal combustion engine comprising:
    an intake manifold assembly comprising:
        an air inlet for allowing said intake air into said manifold assembly;
        a first cover and a base assembly for providing a source of intake air for consumption by the engine, with said first cover being removably joined to said base on an angularly disposed mating surface thereby providing ease of accessibility into said manifold assembly, with said first cover and said base assembly defining an airbox;
        an air plenum communicating with said airbox;
        a second cover removably attached to said first cover and being formed with said air inlet, with said second cover receiving an air filter for filtering intake air flowing from said inlet into said airbox; and,
        a plurality of intake runners integrally formed at least partially within said airbox for directing intake air flowing from said plenum into each cylinder of the engine, with said airbox thereby encapsulating and utilizing the volume of space surrounding said intake runners;
    a throttle valve removably mounted to said manifold assembly and communicating between said airbox and said plenum for metering said intake air supplied to the engine;
    a fuel rail defining a longitudinal axis and being mounted within said manifold assembly for supplying fuel to the engine, with said manifold assembly comprising at least one fuel rail mount for mounting said fuel rail within said manifold assembly;
    with said fuel rail mount comprising:
        a fuel rail base and a fuel rail latch pivotally attached to said fuel rail base, with said fuel rail base receiving said fuel rail and with said fuel rail latch cooperating with said fuel rail base for removably latching said fuel rail to said fuel rail mount; and,
        a biasing member for compensating for any slack between said fuel rail and said mount thereby continually providing a locking force to said fuel rail; and,
    with said fuel rail comprising:
        a rotational locator cooperating with said mount such that said fuel rail may be rotationally positioned relative to the engine; and,
        an axial locator cooperating with said mount such that said fuel rail may be axially positioned relative to the engine.

20. A fuel rail mounting assembly for mounting a fuel rail to an engine comprising:
    a fuel rail mounting base;
    a fuel rail latch pivotally attached to said fuel rail base, with said base receiving said fuel rail and with said fuel rail latch cooperating with said fuel rail base for removably latching said fuel rail to said fuel rail mount; and,
    a biasing member for compensating for any slack between said fuel rail and said mount thereby continually providing a locking force to said fuel rail.

21. A fuel rail mounting assembly according to claim 20 further comprising a rotational locator cooperating with said mount such that said fuel rail may be rotationally positioned relative to the engine.

22. A system according to claim 21 wherein said rotational locator is both a manufacturing datum and a mounting datum thereby reducing tolerance stack-up.

23. A fuel rail mounting assembly according to claim 21 wherein said rotational locator comprises one of a tab laterally extending from said fuel rail in a plane substantially parallel to said longitudinal axis or a flat formed in a sidewall of said fuel rail.

24. A fuel rail mounting assembly according to claim 21 wherein said fuel rail mount comprises a generally V shaped groove for receiving said fuel rail, with said flat in said sidewall of said fuel rail cooperating with said V groove.

25. A fuel rail mounting assembly according to claim 20 wherein said fuel rail comprises an axial locator cooperating with said mount such that said fuel rail may be axially positioned relative to the engine.

26. A fuel rail mounting assembly according to claim 25 wherein said axial locator comprises a rib radially extending form said fuel rail in a plane substantially perpendicular to said longitudinal axis.

27. A fuel rail mounting assembly according to claim 20 wherein said fuel rail base comprises a pivot opening and wherein said fuel rail latch comprises a pivot pin, with said pivot opening receiving said pivot pin and with said pivot opening circumferentially extending only partially around said pivot pin.

* * * * *